March 29, 1932.  E. E. STEVENS  1,851,781

ELECTRICAL TIME DRIFT RECORDER

Filed Oct. 16, 1930

Inventor
Earl E. Stevens
By: Zabel & Kennedy Attys.

Patented Mar. 29, 1932

1,851,781

UNITED STATES PATENT OFFICE

EARL E. STEVENS, OF ELMHURST, ILLINOIS, ASSIGNOR TO ASSOCIATED ENGINEERS COMPANY, OF CHICAGO, ILLINOIS, A CORPORATION OF ILLINOIS

ELECTRICAL TIME DRIFT RECORDER

Application filed October 16, 1930. Serial No. 489,112.

My invention relates to recording devices and particularly to a device for recording continuously the accumulated deviation or error in travel of one device with respect to another taken as a standard due to the changes in speed of the one device whereby to indicate the amount ahead or behind the one device is with respect to the standard at any time after starting.

My invention is particularly applicable to recording the deviation or error in time with respect to a standard clock or electrically operated clocks or the like driven from an alternating current power system by means of synchronous motors. The speed of such motors varies with the frequency of the system and any deviation from a standard frequency will cause a deviation or drift of the system time as indicated by the clock when compared with a standard or master clock. If the frequency deviates from standard in either fast or slow, the system clock will gain or lose accordingly, and the accumulated gain or loss will show on the system clocks as the amount of time they are fast or slow.

It is the purpose of this invention, therefore, to provide a recorder of this character which can readily be applied to the usual recording mechanism used in the station such for example as the frequency recorder in order that the operator may have both the frequency record and the time deviation record before him. If desirable, both records may be made upon the same chart.

It is also the purpose of this invention to provide a recorder of this character which shall have relatively few moving parts and which may also be readily adapted as an indicator to show the time deviation by direct indication as well as by graphic recording.

I will describe one form which my invention will take by reference to the accompanying drawings, wherein—

Figure 1:
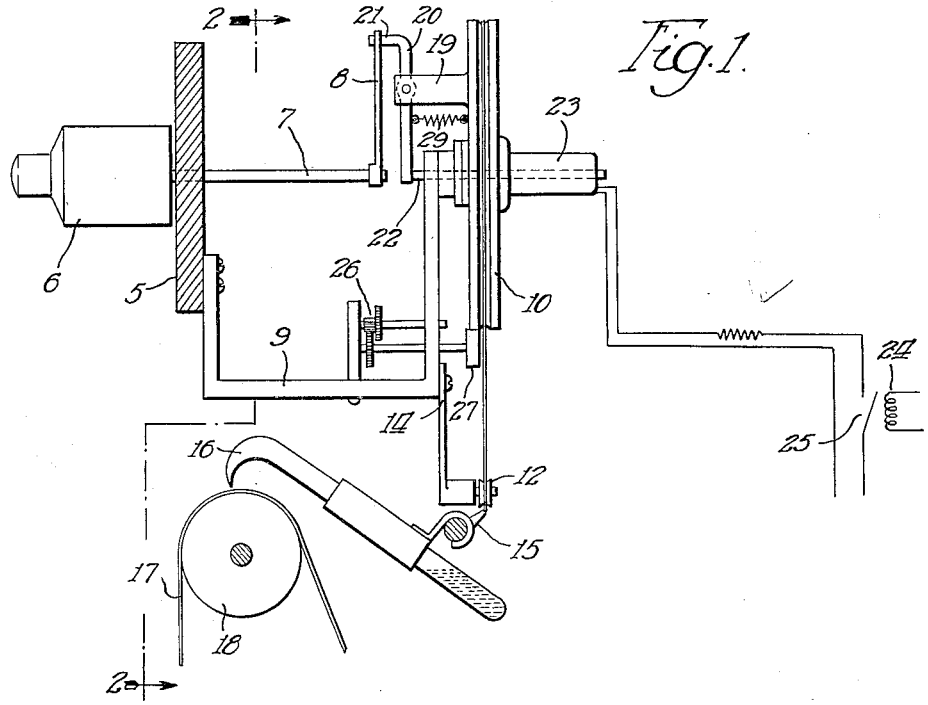
Fig. 1 is a diagrammatic view of the apparatus employed.
Figure 2:
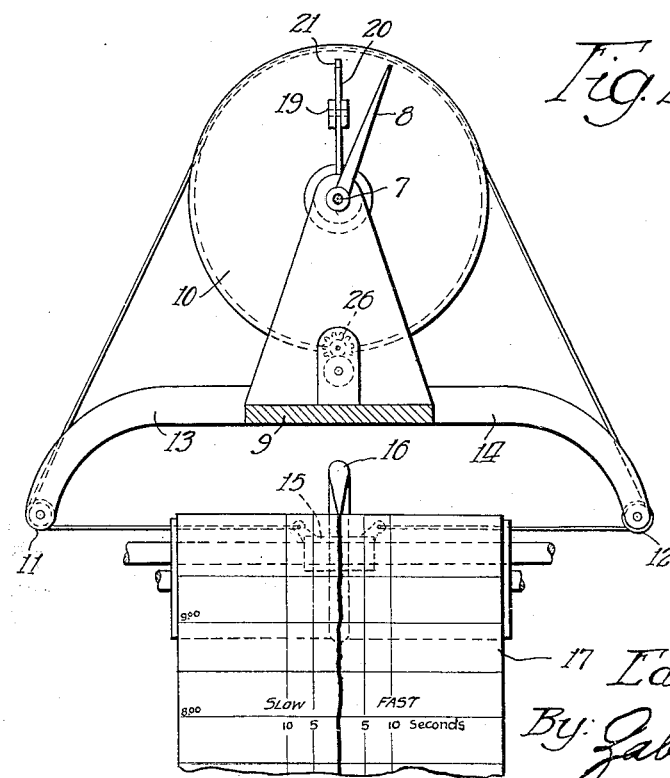
Fig. 2 is a section substantially on the line 2—2 of Fig. 1.

Referring now in detail to the drawings, I might say that all parts of the recorder are designed to be supported by a single supporting member 5, which may be of any suitable form and is preferably a portion of the frequency recording system.

The recorder consists essentially of a synchronous motor 6 receiving current at the system frequency so as to rotate in synchronism with the generators of the power system. This synchronous motor 6 drives a shaft 7 which has an arm 8 thereon. The shaft 7 is preferably made to rotate at substantially one revolution per minute when the standard frequency of the system is maintained.

A frame member 9 carries the pen driving mechanism, which consists of a large disc 10 rotatably mounted on the frame and a pair of pulleys 11 and 12 carried at the ends of arms 13 and 14 and connected to the pen frame 15, so that rotation of disc 10 in one direction or other will move the pen 16 to right or left. The pen 16 engages a suitable chart 17 which may be driven by the roller 18 in the usual manner, and this chart is ruled to indicate deviation from a zero line as a measure of the deviation in time to be recorded. The disc 10 has a lateral projection 19 thereon which projection carries an arm 20 that has the out-turned portion 21 normally lying in the path of arm B. The inner end of arm 20 is directly over the center of disc 10 and is engaged by the end 22 of the solenoid 23. The solenoid 23 is adapted to be operated once each minute by a relay 24 closing the circuit at 25 for solenoid 23, relay 24 being itself operated by a master clock.

A reversing mechanism for the disc 10 consists of a train of gears indicated at 26 and the driving disc 27 directly engaging disc 10.

The operation of the device will now be described in detail.

To start, assume that the time error of the system is zero—that is, a synchronous motor driven clock connected to the power system if initially set correctly would agree with the standard clock—the pen tip of the recorder would, therefore, rest on the reference line representing zero. The synchronous motor will then cause the driven arm 8 to come in contact with arm 20 which is held in position as shown in Fig. 1, by the means of a spring 29 at exactly the time the master clock closes the circuit at 25. This is the condition at starting the operation of the device.

The action of the solenoid plunger 22 on arm 20 moves portion 21 toward disk 10 and allows arm 8 to pass without having moved the discs 10 at all. Therefore, the pen will remain on the zero line of the chart.

Approximately one-half minute later arm 8 engages at its tip with a tooth of the uppermost gear in the gear train 26 and turns this gear a slight amount. This turning acts to rotate the driving disk 27, which is in the form of a small friction wheel and in this manner causes a slight rotation of disk 10 in a direction opposite that of arm 8. The small angle of rotation of disc 10 would, except for slack in the connection of the cord to the pen carriage, move the pen towards the slow side of the chart a short distance. However, there is enough play from the pen carriage and the cord to make the pen remain substantially at rest as long as the system error remains at zero value. The arm 8 in completing its first revolution strikes portion 21 slightly before it is withdrawn by the energizing of solenoid 23. This is because disk 10 has been rotated as above described. The portion 21, however, is withdrawn exactly at the time arm 8 completes its first turn provided that there is no time loss or gain this first revolution. Disk 10 will, therefore, simply be returned to its original position and would thus again release the slack in the cord. Arm 8 on its next revolution again strikes the gear train 26, and the cycle of operations is repeated.

Let us assume now, for example, that the frequency of the system is speeded up a slight amount. This means that shaft 7 will rotate slightly faster, and that arm 8 will engage portion 21 of arm 20 slightly longer before the relay 24 is energized to operate solenoid 23 than was the case at standard or correct frequency.

Arm 8 moves portion 21 and thereby disk 10 along with it until such time as solenoid 23 operates. Disk 10, therefore, moves past its normal stopping position and not only releases the slack in the cord but also moves the pen a short distance toward the fast side of the chart before solenoid 23 operates to withdraw portion 21 from the path of arm 8. Arm 8 in continuing its movement again engages with gear train 26 to cause a reverse rotation of disk 10. This reverse rotation, however, is a fixed amount, and disk 10 will not be moved back from its advanced position sufficiently to overcome any of the excess movement due to the higher speed of shaft 7. Therefore, the next engagement between 21 and 8 will take place in the new position of disk 10. If 7 is still running fast, the arm 8 will again complete more than one complete turn before solenoid 23 is operated to move disk 10 still further beyond its correct time position an amount equal to the additional angular distance over a complete revolution that 8 travelled during the minute. The chart upon which pen 16 is marking will, therefore, have the mark further away from the zero line than the minute before by an amount proportional to the excess angular distance over a revolution that shaft 8 travelled in the last minute. The total distance the pen is away from the zero line, therefore, represents the amount of time the power driven clock is ahead of the standard clock.

Now assuming that the system is started with the disk 10 at its proper place and pen 16 on zero (that is with the system correct), and that the speed of arm 8 decreases because the frequency of the system is reduced, arm 8 will first strike one member of the gear train 26 and turn disk 10 a definite amount in the direction opposite to the direction of rotation of arm 8. However, due to the fact that arm 8 is going slower than normal, it will engage portion 21 and move it only part way back to original position before solenoid 23 operates to retract arm 21 and let arm 8 pass. Now upon the next engagement of arm 8 with the gearing 26, disk 10 will again be moved the same amount as before in the direction opposite to that of arm 8. The result is to move disk 10 still further to the slow side, and pen 16 will be moved toward the slow side of the chart an amount proportional to the amount by which arm 8 failed to make a complete revolution between successive operations of solenoid 23. If upon the next revolution arm 8 is still running too slow to complete its revolution before solenoid 23 operates, a further movement of the pen 16 to the slow side of the chart will be produced.

Thus the distance of the pen record line from the zero or starting line at any time indicates the accumulated loss or gain in time.

From the above description, it is thought that the construction and operation of this device will be clear to those skilled in this art. It is also to be obvious that the instrument may be made into an indicating instrument as well as graphic recorder by applying a pointer to the disc 10 and a scale associated with the disc.

Having thus described my invention, what I claim as new and desire to secure by Letters Patent is:

1. An indicating device comprising a rotating shaft, a rotatable member having means associated therewith for indicating change in its position, means for connecting said member and shaft to intermittently turn said member a definite amount in one direction, cooperating elements associated with said shaft and member respectively adapted to interengage and rotate said member in the other direction, and means for withdrawing one of said elements from the path of the other at regular intervals.

2. An indicating device comprising a rotating shaft, a rotatable member having means associated therewith for indicating change in its position, means for connecting said member and shaft to intermittently turn said member a definite amount in one direction, cooperating elements associated with said shaft and member respectively adapted to interengage and rotate said member in the other direction, and means for withdrawing one of said elements from the path of the other for a short period during each rotation of said shaft.

3. An indicating device comprising a drive member rotated at a speed dependent upon the frequency of the system the time drift of which is to be indicated, a driven member, means connecting said members to move said driven member a slight distance in one direction upon each rotation of said drive member, means carried by said driven member adapted to be engaged by said drive member upon rotation of said drive member, whereby to move said driven member in the opposite direction, and time controlled means moving said last named means out of the path of said drive member periodically.

4. In a power system frequency time error recorder and the like, an integrating device comprising an arm rotating at a speed proportional to the frequency of the system, a rotatable member, means operated by said arm on each rotation thereof to rotate said member slightly in one direction, means on said member engageable by said arm upon rotation thereof whereby to rotate said member in the opposite direction, and means removing said last named means from the path of said arm at intervals equal to the time required for one rotation of said arm at standard frequency.

5. In a frequency time error recorder, a rotatable disk, a rotating crank responsive in speed to changes in frequency, said disk having an element normally in the path of rotation of said arm whereby engagement of said element by said arm rotate said disk in one direction with said arm, means operative at constant intervals to withdraw said element from the path of said arm, and means operated by said arm for rotating said disk in the other direction.

6. In a frequency time error recording device, an integrating member, means moving it in one direction periodically a definite amount, the periods being variable in extent with any variations in frequency, means for moving said member in the other direction at unvarying periods, the extent of movement varying in response to said period variations.

7. In a time error recording device, an integrating element for giving the cumulative variations in speed of one member from that of a second member as a standard, means responsive to said first named member moving said element in one direction periodically a definite amount, the periods being variable with the speed of said first named member, means moving said element in the other direction at intervals controlled by said standard and the extent of the last named movement varying in response to the period variations.

8. In a recorder, a rotatable disk, a rotating crank arm responsive in speed to the device whose variations are to be recorded, said disk having an element normally in the path of rotation of said arm whereby said arm may rotate said disk therewith in one direction, means operated from a standard device for withdrawing, at intervals, said element from the path of said arm, and means operated by said arm for rotating said disk in the opposite direction.

9. An indicating system comprising an integrating element for giving the cumulative variations in speed of one device from that of another device as a standard, a member rotated at a speed dependent upon the speed of the first named device, means connecting said element and member to move said element a slight but constant instance in one direction upon each rotation of said member, means connected with said element adapted to be engaged by said member upon each rotation thereof whereby to move said element in the opposite direction, and means controlled from the standard moving said last named means out of the path of said member periodically.

In witness whereof I hereunto subscribe my name this 6th day of October, A. D. 1930.

EARL E. STEVENS.